(12) United States Patent
Grady

(10) Patent No.: US 7,280,802 B2
(45) Date of Patent: Oct. 9, 2007

(54) FM TRANSMITTER AND POWER SUPPLY/CHARGING ASSEMBLY FOR MP3 PLAYER

(75) Inventor: Jeff Grady, Durham, NC (US)

(73) Assignee: Netalog, Inc., Durham, NC (US)

( * ) Notice: Subject to any disclaimer, the term of this patent is extended or adjusted under 35 U.S.C. 154(b) by 233 days.

(21) Appl. No.: 10/615,108

(22) Filed: Jul. 8, 2003

(65) Prior Publication Data
US 2004/0058649 A1 Mar. 25, 2004

Related U.S. Application Data

(63) Continuation-in-part of application No. 10/197,367, filed on Jul. 17, 2002, now Pat. No. 6,591,085.

(51) Int. Cl.
*H04B 1/00* (2006.01)
*H04B 7/00* (2006.01)

(52) U.S. Cl. .............. 455/42; 455/66; 455/93; 455/99; 320/107

(58) Field of Classification Search ............. 455/3.01, 455/3.04, 3.05, 3.06, 414.1, 41.2, 500, 91, 455/95, 99, 100, 161.1, 346, 343.1, 74, 93, 455/569.1, 569.2
See application file for complete search history.

(56) References Cited

U.S. PATENT DOCUMENTS

| | | |
|---|---|---|
| 5,319,716 A | 6/1994 | McGreevy |
| 5,448,757 A | 9/1995 | Hirata |
| 5,771,441 A | 6/1998 | Altstatt |
| 5,860,824 A | 1/1999 | Fan |
| 5,970,390 A | 10/1999 | Koga et al. |
| 6,157,163 A | 12/2000 | Blackwood |
| 6,163,711 A | 12/2000 | Juntunen et al. |
| 6,240,297 B1 | 5/2001 | Jadoul |
| 6,292,440 B1 | 9/2001 | Lee |

(Continued)

FOREIGN PATENT DOCUMENTS

JP  6309854 A  11/1994

(Continued)

OTHER PUBLICATIONS

The Internet Archive, "The Wayback Machine—Frequently Asked Questions," exceprted from Web publication at http://www.archive.org/about/faqs.php#The_Wayback_Machine as viewed on Nov. 15, 2005.

(Continued)

Primary Examiner—Tony T. Nguyen
(74) Attorney, Agent, or Firm—Vincent K. Gustafson; Intellectual Property/Technology Law

(57) ABSTRACT

An FM transmitter and power supply/charging assembly electrically coupleable with an MP3 player. The assembly includes a modular docking unit having a main body portion with a docking cavity therein, wherein the main body portion contains the FM transmitter and power/charging circuitry, with coupling means in the docking cavity for connecting the MP3 player with the FM transmitter and power/charging circuitry, to accommodate FM transmission by the FM transmitter of audio content when played by the MP3 player in the docking cavity of the modular docking unit, and adapted for transmitting electrical power through the modular docking unit and the power/charging circuitry therein, for charging of a battery of the MP3 player and/or powering of the MP3 player.

73 Claims, 16 Drawing Sheets

U.S. PATENT DOCUMENTS

| | | | |
|---|---|---|---|
| 6,304,764 B1 | 10/2001 | Pan | |
| 6,317,497 B1 | 11/2001 | Ou | |
| 6,381,452 B1 | 4/2002 | Tien et al. | |
| 6,396,769 B1 | 5/2002 | Polany | |
| 6,420,849 B2 | 7/2002 | Murphy | |
| 6,423,892 B1 | 7/2002 | Ramaswamy | |
| 6,509,716 B2 | 1/2003 | Yi | |
| 6,532,152 B1* | 3/2003 | White et al. | 361/692 |
| 6,573,683 B2* | 6/2003 | Chang | 320/107 |
| 6,608,399 B2* | 8/2003 | McConnell et al. | 307/10.1 |
| 6,631,098 B2 | 10/2003 | Chang et al. | |
| 6,671,494 B1 | 12/2003 | James | |
| 6,681,120 B1 | 1/2004 | Kim | |
| 6,781,519 B1* | 8/2004 | Diaz | 340/825.72 |
| 6,782,239 B2* | 8/2004 | Johnson et al. | 455/42 |
| 6,788,528 B2 | 9/2004 | Enners et al. | |
| 6,798,173 B2 | 9/2004 | Hsu | |
| 7,013,164 B2 | 3/2006 | Lin | |
| 2001/0049566 A1 | 12/2001 | Kim | |
| 2002/0032042 A1* | 3/2002 | Poplawsky et al. | 455/564 |
| 2002/0038432 A1 | 3/2002 | Hsu | |
| 2002/0072390 A1 | 6/2002 | Uchiyama | |
| 2002/0077834 A1 | 6/2002 | Estevez | |
| 2002/0086716 A1 | 7/2002 | Pan | |
| 2002/0098813 A1 | 7/2002 | Likourezos et al. | |
| 2002/0105861 A1 | 8/2002 | Leapman | |
| 2002/0132651 A1 | 9/2002 | Jinnouchi | |
| 2002/0151327 A1* | 10/2002 | Levitt | 455/556 |
| 2002/0173866 A1 | 11/2002 | Dangberg et al. | |
| 2003/0026438 A1 | 2/2003 | Yamamoto | |
| 2003/0041206 A1 | 2/2003 | Dickie | |
| 2003/0114133 A1 | 6/2003 | Enners | |
| 2003/0194968 A1* | 10/2003 | Young | 455/45 |
| 2004/0091124 A1 | 5/2004 | Chua et al. | |
| 2004/0151327 A1 | 8/2004 | Marlow | |
| 2004/0224638 A1* | 11/2004 | Fadell et al. | 455/66.1 |
| 2005/0049009 A1 | 3/2005 | Yamamoto | |

FOREIGN PATENT DOCUMENTS

| | | |
|---|---|---|
| JP | 2002-007004 A1 | 1/2002 |
| JP | 2002-178857 A | 6/2002 |
| JP | 2002178857 | 6/2002 |
| KR | 10-2001-0008949 A1 | 2/2001 |
| KR | 10-2002-0014875 A1 | 2/2002 |
| KR | 2002010350 | 2/2002 |
| KR | 20020010350 | 2/2002 |
| KR | 2002054686 A | 7/2002 |
| KR | 20020054686 | 7/2002 |
| TW | 463747 B | 11/2001 |
| TW | 483747 | 11/2001 |
| TW | 487260 B | 5/2002 |
| TW | 51432 | 12/2002 |
| TW | 514321 B | 12/2002 |
| TW | M245676 | 10/2003 |
| TW | M245676 B | 10/2004 |
| TW | M253152 B | 12/2004 |
| TW | M262927 B | 4/2005 |
| WO | WO-00/55853 A1 | 9/2000 |
| WO | WO-02/37499 A1 | 5/2002 |

OTHER PUBLICATIONS

The Internet Archive, "Search Results for Jan. 1, 1996-Nov. 15, 2005 for http://arkon.com," Web publication at http://web.archive.org/web/*/http://arkon.com as viewed on Nov. 15, 2005.

Arkon Resources Inc., "SF340—Soundfeeder™ CD Mount™ Car Mounting Kit With Built-In Wireless Audio Adapter & DC Power Supply," copy of product insert cards (undated).

Arkon Resources Inc., "Owner's Manual For Soundfeeder™ CD Mount™ With Built-In Car Adapter, Model SF340," owner's manual, copyright 1996.

Photographs of Arkon SF340 Soundfeeder™ CD Mount™ With Built-In Car Adapter (undated).

The Internet Archive/Arkon Resources Inc., "SF340—CD Mount™ Car Kit with Built-In DC Audio Adapters," Web publication at http://web.archive.org/web/20001029114437/www.arkon.com/SF340.htm, as archived on Oct. 29, 2000 and viewed on Nov. 15, 2005.

The Internet Archive/Arkon Resources Inc., "SF342—CD Mount™ Cup Holder Car Kit with Built-In DC Audio Adapters," Web publication at http://web.archive.org/web/20001029124413/www.arkon.com/SF342.htm, as archived on Oct. 29, 2000 and viewed on Aug. 25, 2005.

The Internet Archive/Arkon Resources Inc., "CD mounting kist (sic) by Arkon Resources" Web publication at http://web.archive.org/web/19991005210543/http://arkon.com/cd.html, as archived on Oct. 5, 1999 and viewed on Aug. 25, 2005.

The Internet Archive/Arkon Resources Inc., "Mobile Audio Mounting Kits For Portable CD Players," Web publication at http://web.archive.org/web/20001019004111/www.arkon.com/cd.html, as archived on Oct. 19, 2000 and viewed on Aug. 15, 2005.

Arkon Resources Inc., photograph of "SF340 CD Mount Kit" installed in vehicle with associated CD player (undated).

Arkon Resources Inc., line drawing of SF345 CD-Mount installed in vehicle without associated CD player (undated).

Arkon Resources Inc., "Soundfeeder SF345 CD-Mount With Built-In Car Adapter," photograph of packaged product (undated).

Arkon Resources Inc., photographs of "SF345 CD Mount Kit" installed in vehicle; (a) side view without CD player clamped thereto; (b) side view with CD player clamped thereto; and (c) front view with CD player clamped thereto (undated).

United States Federal Communications Commission, "Grant of Equipment Authorization—Certification" to Arkon Resources Inc. for FCC Identifier ME2-SF345-SF340, Feb. 23, 1996, Web publication available by search for Applicant Name "Arkon Resources" at https://gullfoss2.fcc.gov/prod/oet/cf/eas/reports/GenericSearch.cfm.

Arkon Resources Inc., "Mobile Electronic Accessories For The Next 1000 Years," product catalog, 2000.

The Internet Archive/Arkon Resources Inc., "Soundfeeder" [SF100, SF120, SF121], Web publication at http://web.archive.org/web/20010813021714/www.arkon.com/sf.html , as archived on Aug. 13, 2001 and viewed on Nov. 15, 2005.

The Internet Archive/Arkon Resources Inc., "SF120 Soundfeeder Wireless Audio Adapter," Web publication at http://web.archive.org/web/20010820131530/www.arkon.com/SF120.htm, as archived on Aug. 20, 2001 and viewed on Nov. 15, 2005.

The Internet Archive/Arkon Resources Inc., "Soundfeeder FM Stereo Transmitter Model—SF121," Web publication at http://web.archive.org/web/20010804135107/www.arkon.com/SF121.htm, as archived on Aug. 4, 2001 and viewed on Nov. 15, 2005.

The Internet Archive/Arkon Resources Inc., "SF145 CD Mount" Web publication at http://web.archive.org/web/20001029113500/www.arkon.com/SF145.htm, as archived on Oct. 29, 2000 and viewed on Nov. 15, 2005.

Arkon Resources Inc., "Universal Multimedia Mounts For Pocket PC Handheld Computers," trade show brochure, 2001.

Arkon Resources Inc., "Universal Multimedia PDA Mounts," advertisement (undated).

The Internet Archive/Arkon Resources Inc., "Multimedia Mounts," Web publication at http://web.archive.org/web/20010813012145/www.arkon.com/multimedia.html, as archived on Aug. 13, 2005 and viewed on Nov. 15, 2005.

The Internet Archive/Arkon Resources Inc., photograph of CM320 Windshield/Console Multimedia Mount, Web publication at http://web.archive.org/web/20010608173505/www.arkon.com/images/CM320.jpg, as archived on Jun. 8, 2001 and viewed on Nov. 15, 2005.

The Internet Archive/Arkon Resources Inc., photograph of CM323 Cup Holder Multimedia Mount, Web publication at http://web.archive.org/web/20010608174302/www.arkon.com/images/CM323.jpg, as archived on Jun. 8, 2005 and viewed on Nov. 15, 2005.

The Internet Archive/Arkon Resources Inc., photograph of CM329 Vent Mount Multimedia Kit, Web publication at http://web.archive.org/web/20030620102929/www.arkon.com/images/CM329.jpg, as archived on Jun. 20, 2005 and viewed on Nov. 15, 2005.

Wagner, Samuel C., "Arkon's Multimedia PDA Mount," Web publication at http://web.archive.org/web/20010803155949/www.pocketpcpower.net/PDAMount.htm, dated Jul. 18, 2001, as archived on Aug. 3, 2001 and viewed on Nov. 15, 2005.

Spera, Christopher, "PDA Mounts With a Twist—Arkon Resources' PDA Multimedia Mounts," Web publication at http://www.pocketnow.com/index.php?a=portal_print&t=reviews&id=145 , dated Aug. 20, 2001, with magnified images copied from the same publication.

The Internet Archive/Arkon Resources Inc., "Arkon's NEW Multimedia Mounting Solutions for the Compaq iPAQ® Pocket PC," Web publication at http://web.archive.org/web/20020310082543/www.arkon.com/expansion.html, as archived on Mar. 10, 2002 and viewed on Nov. 15, 2005.

www.drbott.com, "Dr. Bott's iPod Universal Connection Kit with FM Transmitter," Web publication at http://www.drbott.com/prod/db/lasso?code=0142-IPCK , including linked photograph of product at http://www.drbott.com/images/lg/0142-IPCK.jpg , as viewed on Nov. 16, 2005.

Netalog, Inc., "DLO iPod Auto Connection Kit II w/ FM Transmitter (For 3G iPods) Item #:w009-3333,"Web publication at http://www.everythingipod.com/product222.tpl?command=search&db=dbs/products.db&eqSTORE1datarq=IPOD&cart=11320871474387693&eqPRONAMEdatarq=DLO%20iPod%20Auto%20Connection%20Kit%20II%20%20w/%20FM%20Transmitter%20%28For%203G%20iPods%29&searchSKU=w009-3333&eqAVAILdatarq=YES&max=1 as viewed on Nov. 15, 2005.

Photographs of "DLO Auto Connection Kit II w/ FM Transmitter" package and package contents (undated).

Excerpts of Oct. 27, 2005 Deposition of Aaron Roth in *Netalog, Inc. v. Griffin Technology, Inc.* patent litigation (relating to U.S. Patent No. 6,591,085), M.D.N.C. Case No. 1:04-CV 00850, pp. 1-8, 10-17, 19-28, 30-41, 49-72, 84-91, 95-98 & Exhibits C, E, F, Q, R, S, T, U, V, W, 160.

Voice Magic Plus, Found on-line Jun. 21, 2006 at http://www.gadgetcentral.com/voicecell_intro.html, Mar. 30, 2000.

Priority Tech Inc., Priority Tech Products—Platinum Series; Hands-Free Kits, Found on-line on Jul. 19, 2006 at http://web.archive.org/web/20010805114853/www.priorityusa.com/newproducts_fullbands.html, 1999, Publisher: Priority Tech, Inc.

Evangelista, Benny, Dial M for music, San Francisco Chronicle -- found online at http://ww.sfgate.com/cgi-bin/article.cgl?file=/chronicle/archive/2000/11/01/BU105818.DTL, November 1, 2000.

World's first MP3 phone, Popular Mechanics -- found online at http://www.popularmechanics.com/technology/upgrade/1279751.html, October 1, 2000.

Smith, Tony, Sprint PCS to launch mobile MP3 scheme, The Register -- found online at http://www.theregister.com.uk/2000/11/01/sprint_pcs_to_launch_mobile/,November 1, 2000.

Wearden, Graeme, Virgin rolls out world's first MP3 phone, Tech news on ZDNet -- found online at http://news.zdnet.com/2100-9595_22-523423.html, August 28, 2000.

Williams, Martyn, Sony squeezes MP3 player into cell phone, PC World.com -- found online at http://archives.cnn.com/3000/TECH/computing/12/12/mp3.cell.phone.idg/index.html, December 12, 2000.

* cited by examiner

FM TRANSMITTER AND POWER SUPPLY/CHARGING ASSEMBLY FOR MP3 PLAYER

CROSS-REFERENCE TO RELATED APPLICATION

This is a continuation-in-part of U.S. patent application Ser. No. 10/197,367 filed Jul. 17, 2002 in the name of Jeff Grady for "FM TRANSMITTER AND POWER SUPPLY/CHARGING ASSEMBLY FOR MP3 PLAYER," issuing Jul. 8, 2003 as U.S. Pat. No. 6,591,085.

BACKGROUND OF THE INVENTION

1. Field of the Invention

This invention relates to accessories for MP3 players used for on-line downloading, storage and playing of music. More specifically, the invention relates to an FM transmitter and power supply/charging assembly for such MP3 players, and to a kit comprising such assembly in combination with other mounting/power/charging accessories.

2. Description of the Related Art

Music players of widely varying type are ubiquitous throughout the world, and have evolved through various forms over the years, from portable single transistor radios in the 1950's to tape cassette players to compact disc players and more recently to MP3 players, which enable a user to download audio material from an internet site and store same in storage medium of a player in an MP3 (MPEG-1 audio layer 3) format for subsequent selective listening.

A number of MP3 players have been developed and are commercially available, including the Nomad jukebox commercially available from Creative Labs, SonicBlue's rio volt, jukebox recorder commercially available from Archos Technology, and numerous others. A high-capacity MP3 player of such type is the iPOD™ MP3 player commercially introduced by Apple Computer, Inc. (Cupertino, Calif.) in 2001. The Apple iPOD has a capacity for approximately 1000 songs of commercial play length.

MP3 players of the aforementioned type rely on batteries for their portability, and are typically provided with a headset for user listening.

One problem associated with the small size and lightweight characteristics of such MP3 players, as requisite to their portability and ease of use, is battery life. Another problem is the personal character of the headphone-equipped MP3 player. The MP3 player may be equipped with a speaker, but its small size and light-weight characteristics limit the size of the speaker, making it less than desirable when it is desirable to transmit music to a group of persons, such as in a vehicle passenger compartment, or a room.

SUMMARY OF THE INVENTION

The present invention relates in one embodiment to an FM transmitter and power supply/charging assembly for an MP3 player.

In one embodiment, the FM transmitter and power supply/charging assembly comprises a unitary and modular docking unit, in which the MP3 player is reposable in electrical communication therewith. The docking unit in a specific embodiment accommodating the iPOD™ MP3 player, the docking unit interconnects with the MP3 player via the MP3 player headphone and firewire ports. In other embodiments, accommodating MP3 players without firewire ports, the docking unit may interconnect with the MP3 player via the headphone and power port. The base docking unit contains within the unitary housing an FM transmitter and firewire power plug for the MP3 player. The base docking unit is provided with a matable plug coupling, for joining of the base docking unit to any of suitable power/charging components attachable thereto.

In another embodiment, the base docking unit of the FM transmitter and power supply/charging assembly is provided as a component of a multi-accessory kit. The kit comprises, in addition to the base docking unit, a ratcheting arm coupleable with a cigarette lighter power socket, e.g., a conventional 12 volt socket, in which the arm also functions as a mounting device which is pivotably adjustable to spatially position the MP3 player and affixed docking unit in any of a variety of spatial positions, relative to the user. The kit optionally also includes a short adaptor coupleable with a power supply, e.g., in a desk mount or wall mount plate. The kit optionally further includes a desk mount that is engagable with the short adaptor, to provide a desk mountable conformation of the MP3 player, and/or a wall mount plate for wall mounting of the FM transmitter and power supply/charging assembly, so that the MP3 player may be disposed in the modular docking unit as wall mounted.

Other aspects, features and advantages of the present invention will be more fully apparent from the ensuing disclosure and appended claims.

DETAILED DESCRIPTION OF THE INVENTION, AND PREFERRED EMBODIMENTS THEREOF

The present invention, in one embodiment, provides an integrated FM transmitter and power supply/charging assembly for an MP3 player, that dramatically increases the utility of the basic MP3 player.

The FM transmitter in the assembly according to one embodiment of the invention transmits music played through the MP3 player to a range of FM frequencies, enabling FM reception of audio music signals that then can be played through an FM receiver, such as an FM radio receiver in a vehicle, a FM radio in proximity to the FM transmitter, and otherwise for extended area broadcast of the MP3 player-originated music.

As one example, the base dock unit of the FM transmitter and power supply/charging assembly may be deployed in an automobile or other vehicular environment, wherein the unit is powered by a power adaptor plugged into a cigarette lighter socket of the vehicle. The FM transmitter then transmits the MP3 player-originated music to the FM receiver in such vehicle, enabling the acoustic system of the vehicle to be employed for broadcast of the music to the interior passenger compartment of the vehicle.

The FM transmitter and power supply/charging assembly may as hereinafter described more fully comprise an AC charger enabling the battery of the MP3 player to be recharged to a more fully charged state allowing its use to be lengthened while on battery power.

The FM transmitter and power supply/charging assembly may be provided in a kit including the base docking unit and various adaptor/charger/mount accessories, as hereinafter described.

Although the ensuing discussion is directed to an embodiment having specific use and applicability to the iPOD MP3 player, it will be recognized that the utility of the invention is not thus limited, but rather extends to and encompasses other MP3 players. Accordingly, although the iPOD MP3 player utilizes a firewire port for power connection purposes, other types of port and electrical connection means may be employed.

Figure 1:
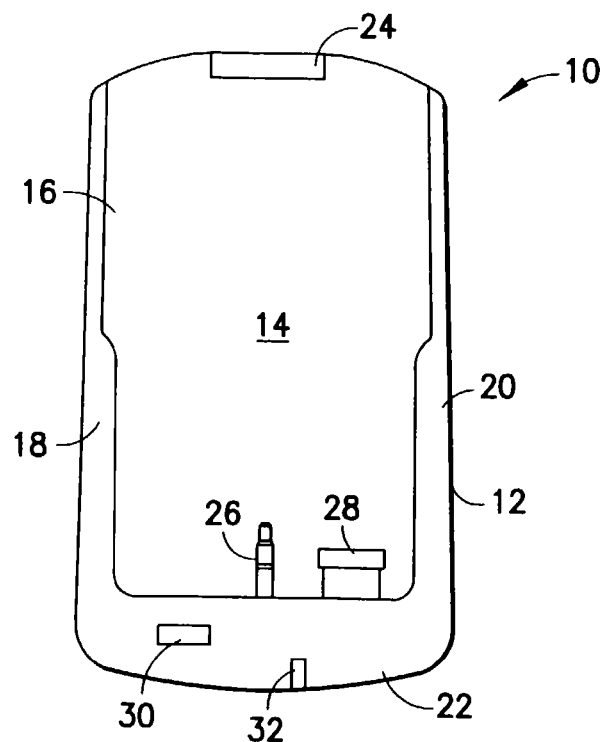
FIG. 1 is a front elevation view of an FM transmitter and power supply/charging assembly according to one embodiment of the present invention.

Referring now to the drawings, FIG. 1 shows a front elevation view of an FM transmitter and power supply/charging assembly 10 having a main body portion 12 including a back wall whose surface 14 together with side rails 18 and 20 define a cavity in which the MP3 player is selectively reposable. Such an FM transmitter and power supply/charging assembly, along with assemblies according to other embodiments, are sometimes referred to hereinafter as the modular docking unit(s).

As shown in FIG. 1, the modular docking unit is provided with a male connector element 26 matably engagable with the headphone port of the MP3 player, as well as a coupling 28 matably engagable with the firewire port of the MP3 player.

In the housing of the modular docking unit according to one embodiment is provided an FM transmitter, which transmits music played through the MP3 player to a range of FM frequencies. The FM transmitter may be of any suitable type, and operates to transmit music to an FM receiver in the vicinity of the MP3 player.

The FM transmitter may for example be provided having a tuning frequency in the FM band of 88-95 Megahertz (MHz) and a transmission range of 4-6 feet or more. Stereo transmitters of such type are readily commercially available, and are of appropriate size for incorporation in the modular docking unit.

The FM transmitter may simply transmit at a frequency fixed in the aforementioned 88-95 MHz band, or the transmitter may be tunable to select a specific frequency within such spectrum.

In operation, the FM receiver receives the transmitted audio from the MP3 player transmitted by the modular docking unit, and the FM receiver, e.g., in a user's automobile, then is able to transmit the audio content to the vehicular sound system, e.g., by tuning the FM receiver to the frequency of the transmitter in the modular docking unit.

The modular docking unit in the interior of its housing also includes circuitry and components for charging the battery of the MP3 player, through the firewire power port or other electrical input port (e.g., USB or other port) to charge the MP3 player's battery, as well as providing power to the MP3 player when docked in the modular docking unit.

As shown in FIG. 1, the modular docking unit has on a lower portion 22 thereof indicator lights 30 and 32, which are configured for indicating when the MP3 player is charging or fully charged, and/or when the MP3 player is "ON."

The modular docking unit may also be provided with an ON/OFF switch, or selectively actuating the MP3 player, charging function of the modular docking unit, etc.

Figure 2:
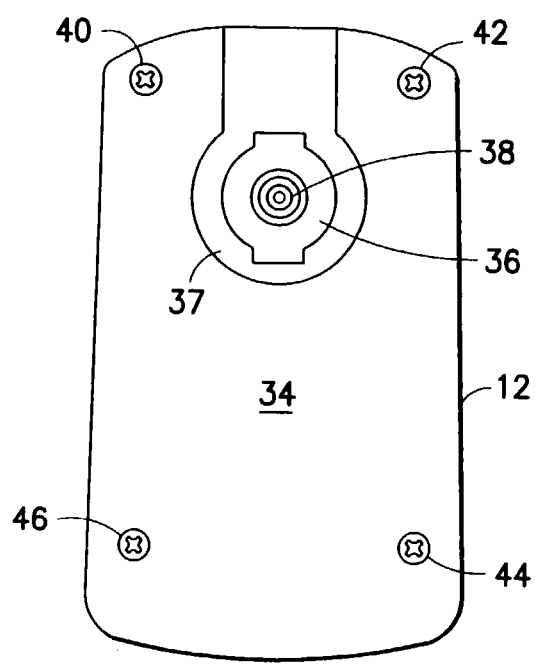
FIG. 2 is a rear elevation view of the FM transmitter and power supply/charging assembly of FIG. 1.

FIG. 2 is a rear elevation view of the MP3 player, showing the back wall surface 34, on which is provided a boss 37 forming a coupling cavity 36 including a power connector element 38. The housing of the modular docking unit may be of a 2-piece construction, with mechanical fastener elements 40, 42, 44 and 46 serving to couple the respective parts of the unit. Alternatively, the modular docking unit may be formed of a unitary molded material, having a port or opening therein for insertion and assembly of the interior components, including circuitry and components as described hereinabove.

Figure 3:
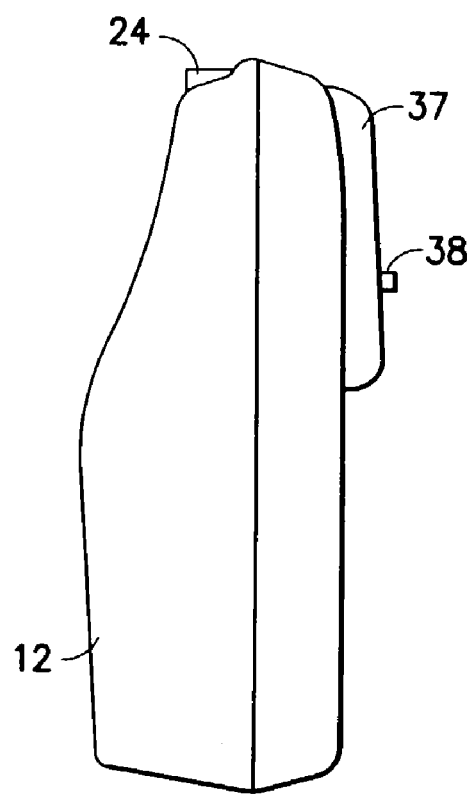
FIG. 3 is a right-hand side view, in elevation, of the assembly of FIGS. 1-2.
Figure 4:
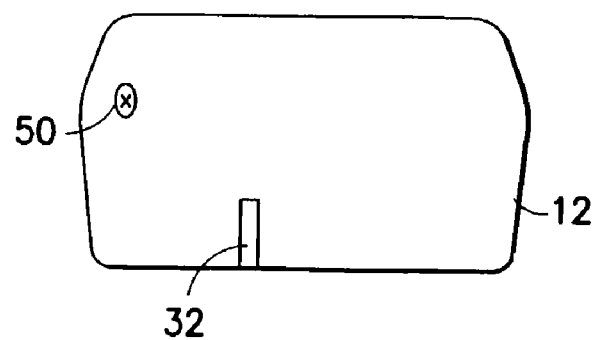
FIG. 4 is a bottom plan view of the assembly of FIGS. 1-2.

FIG. 3 is a right-hand side elevation view of the modular docking unit, showing the retention member 24 at the upper portion of the housing. FIG. 4 is a bottom plan view of the modular docking unit, including a further mechanical fastener 50 for retaining interior assembly elements of the unit.

Figure 5:
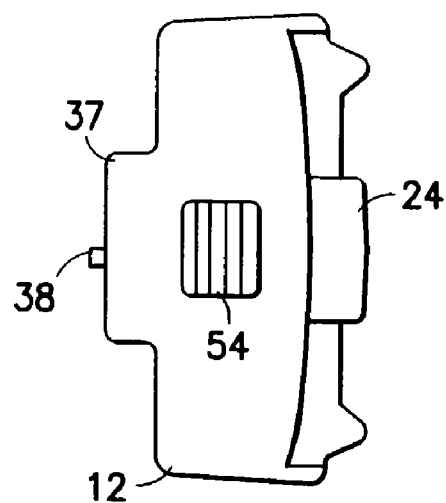
FIG. 5 is a top plan view of the assembly of FIGS. 1-2.

FIG. 5 is a top plan view of the modular docking unit, showing the retention member 24, which is selectively disengagable by thumb-actuatable release member 54.

Figure 6:
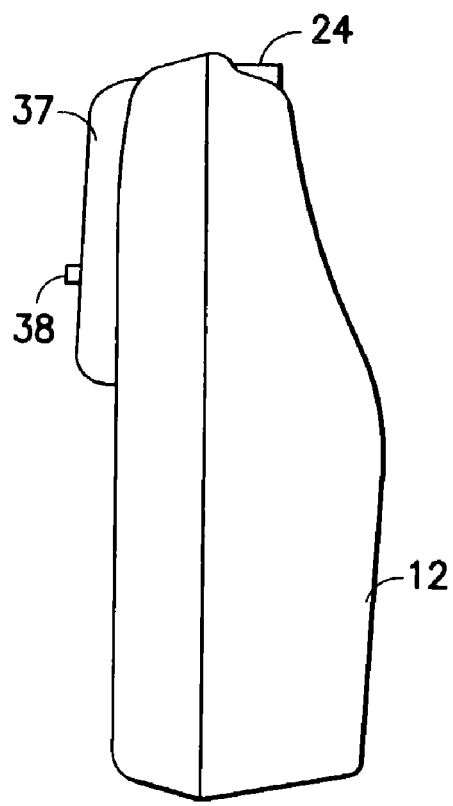
FIG. 6 is a left-hand side view, in elevation, of the assembly of FIGS. 1-2.

FIG. 6 is a left-hand side elevation view of the modular docking unit, showing the symmetrical character of same relative to the view illustrated in FIG. 3.

Figure 7:
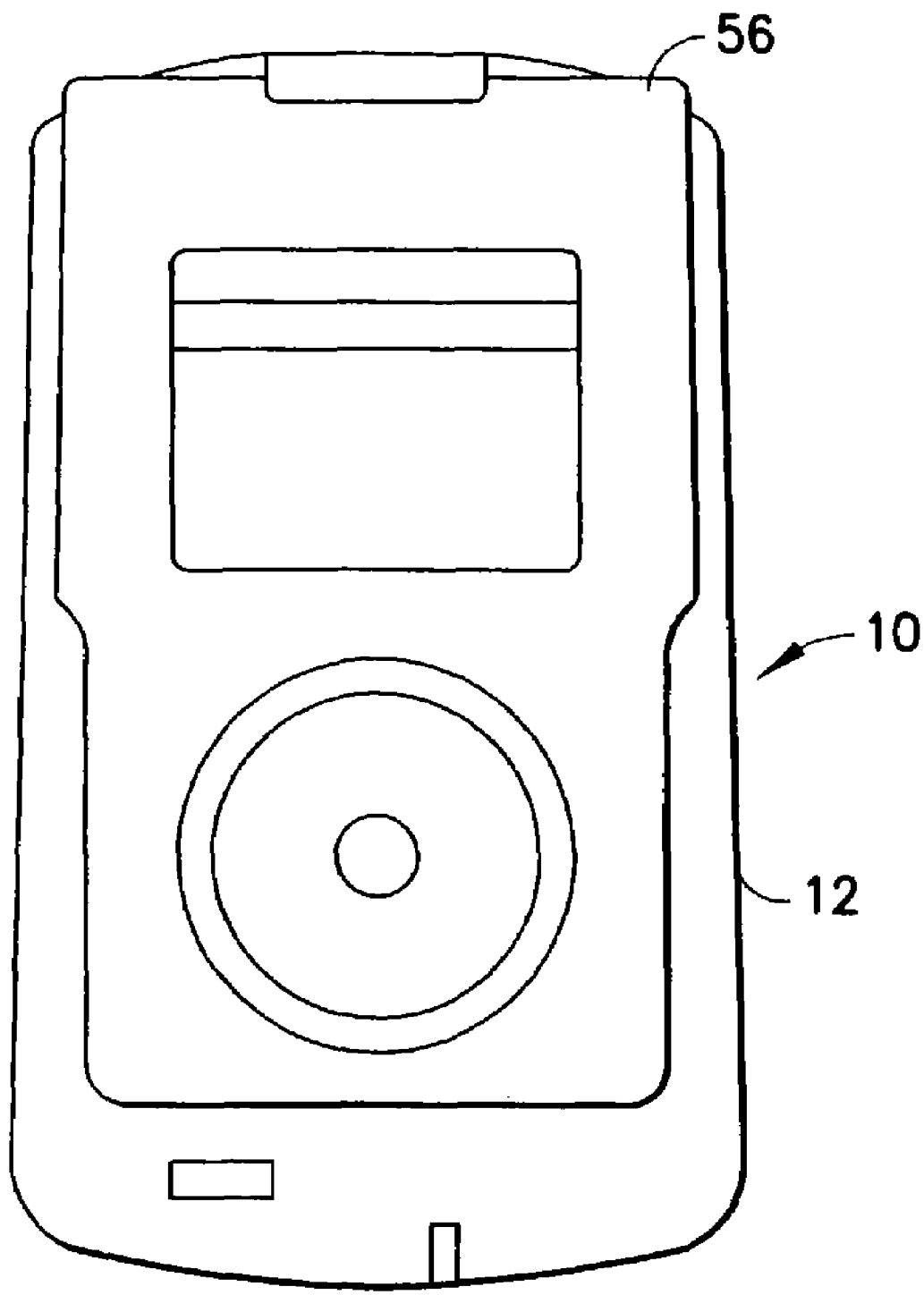
FIG. 7 is a front elevation view of the FM transmitter and power supply/charging assembly of FIG. 1, with an MP3 player mounted therein.

FIG. 7 illustrates the FM transmitter and power supply/ charging assembly 10 having an MP3 player 56 disposed in the cavity of the body 12.

Figure 8:
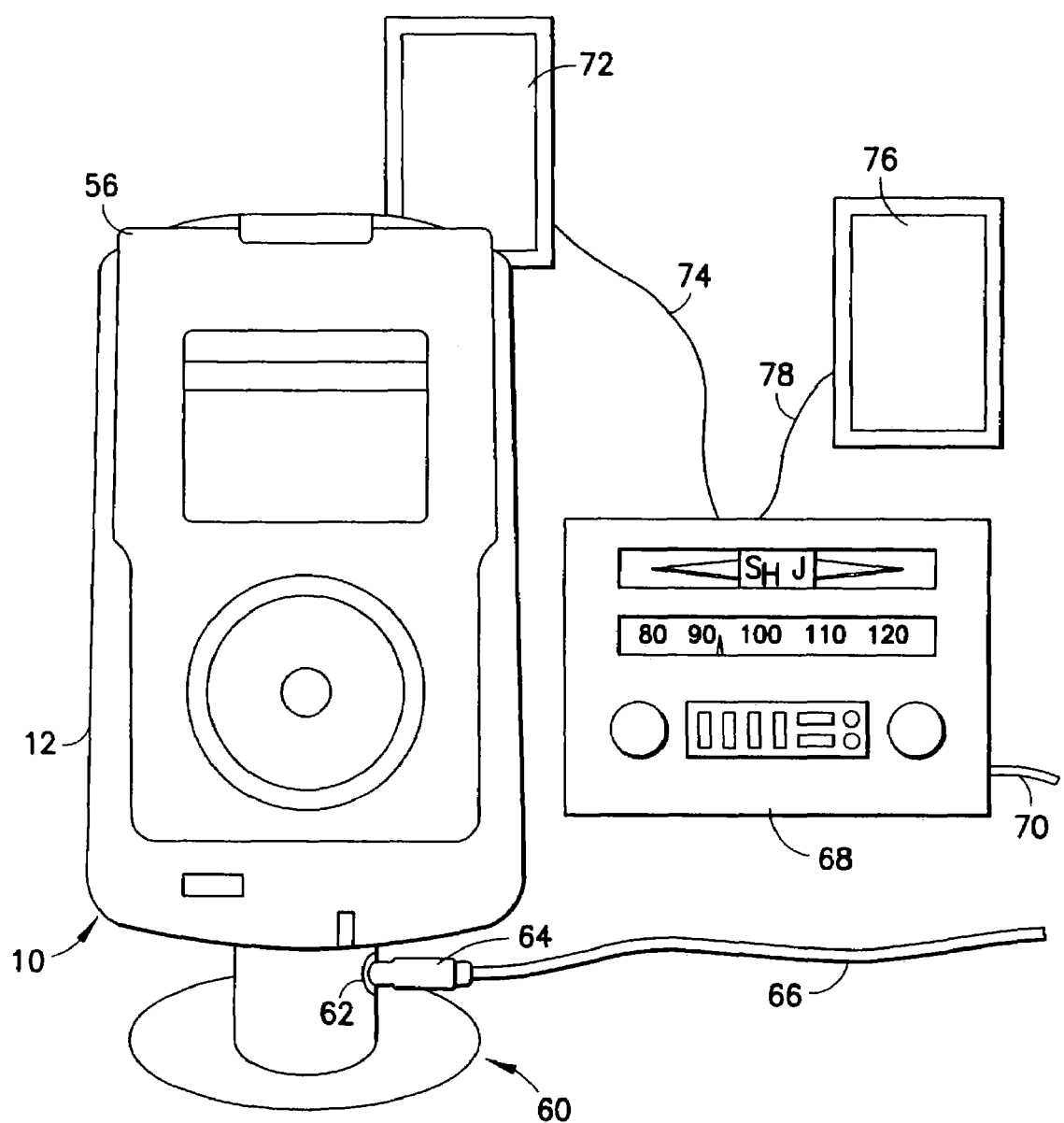
FIG. 8 is a schematic representation of an audio system including the modular docking unit of the FM transmitter and power supply/charging assembly according to one embodiment of the invention, having an MP3 player mounted therein, and arranged in FM transmitting relationship to an FM receiver having audio speakers attached thereto.

FIG. 8 is a corresponding view of MP3 player 56 mounted in the body 12 of the FM transmitter and power supply/ charging assembly 10. In this configuration, the modular docking unit is mounted on a pedestal 60 having an arm extending upwardly at the rear of the modular docking unit and coupling with the power element 38 on boss 37 (see FIGS. 2, 3 and 6). The pedestal 60 is provided with an electrical coupling 62 accommodating power plug 64 connected to power cord 66, providing power to the pedestal 60 for transmittal through contact 38 to the MP3 player by element 28, as shown in FIG. 1.

When the MP3 player is actuated to play the stored audio content, the corresponding signal is transmitted through coupling element 26 shown in FIG. 1 to the FM transmitter in the housing of the modular docking unit, generating an FM signal that is transmitted to FM receiver 68 powered by power cord 70. The FM receiver 68 in turn is coupled by speaker wires 74 and 78 to speakers 72 and 76, respectively. In such manner, the audio content played by the MP3 player 56 is transmitted by the FM transmitter to FM receiver 68 and outputted as sound output at speakers 72 and 76.

Concurrently, the MP3 player can be electrically charged to renew the battery power of the unit, so that when undocked from the modular docking unit, the MP3 player may be outfitted with earphones and deployed in a personal listening arrangement.

Although the FIG. 8 embodiment is shown as including a table-type FM receiver, it will be recognized that the arrangement is illustrative only, and is adaptable to automotive or vehicular sound systems including an FM receiver.

The modular docking unit as shown in FIGS. 1-6 may be coupled with a power source in any suitable manner.

Figure 9:
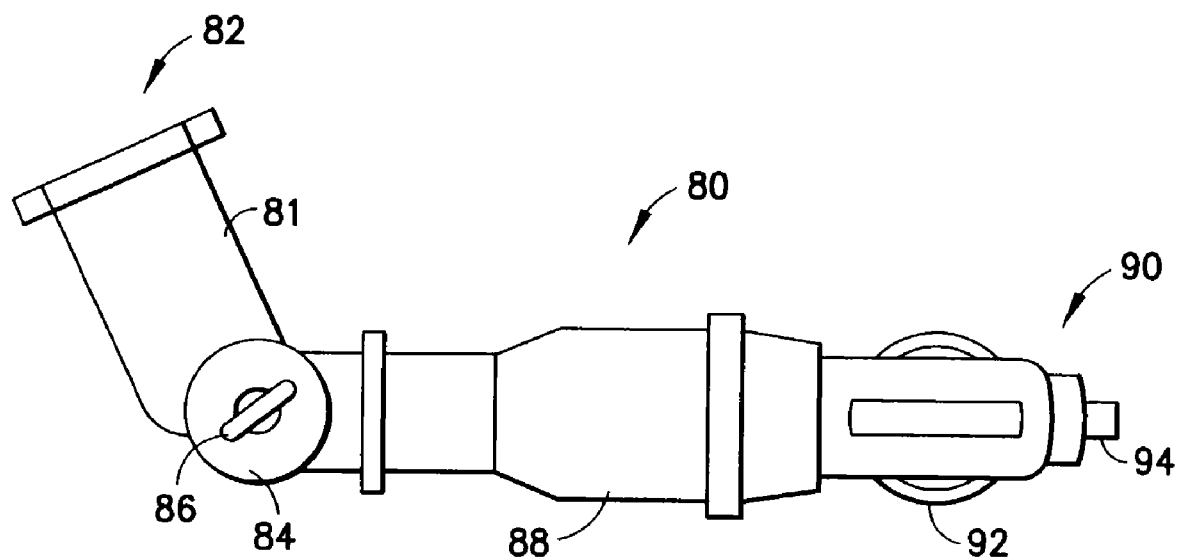
FIG. 9 is a pivotably adjustable ratchet adaptor, which is coupleable with a cigarette lighter power socket, e.g., a conventional 12 volt socket, wherein the outer coupling end of the adaptor is engagable with the port on the rear face of the docking unit of the FM transmitter and power supply/charging assembly, with the ratchet arm being pivotably adjustable to spatially position the MP3 player at a given orientation relative to a user.

FIG. 9 shows a ratchet-type adaptor 80 including engagement structure 82 matable with the cavity 36 shown in FIG. 2 on the modular docking unit. The coupling structure 82 is at the face of tubular member 81 which is pivotably mounted on spindle 84 which is positionable by means of the manual wing-nut 86, which is selectively manually tightenable or loosenable, to adjust the attitude of tubular member 81 relative to the main body 88 of the adaptor. The main body 88 is joined to a plug end 90 featuring electrical contact elements 92 and 94, for engagement of the plug end 90 with a corresponding socket, such as a cigarette lighter socket of a motor vehicle.

Figure 10:
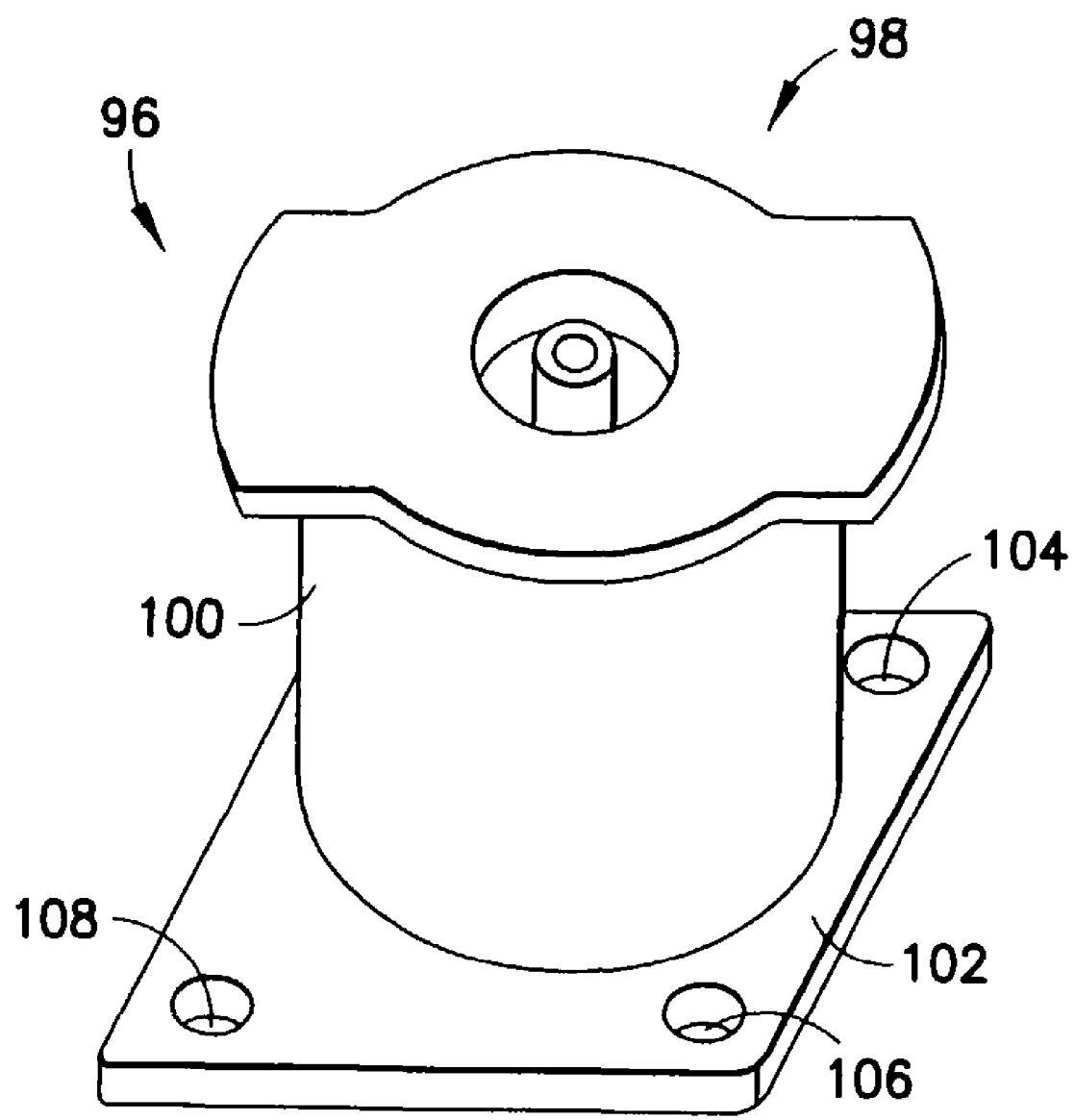
FIG. 10 is a short adaptor coupleable with the coupling structure on the rear face of the docking unit of FIGS. 1-6, wherein the adaptor includes a wall mounting plate, accommodating wall mounting of the FM transmitter and power supply/charging assembly.

FIG. 10 shows another adaptor 96 having engagement structure 98 at the extremity of cylindrical member 100 mounted on plate number 102. The engagement structure 98 is engagable with the cavity 37 at the rear face of the modular docking unit (see FIG. 2).

The plate 102 shown in FIG. 10 is provided with mounting openings 104, 106 and 108, for wall-attachment of the adaptor, using mounting screws, nails, etc.

The adaptor shown in FIG. 10 permits the modular docking unit to be wall-mounted, whereby the MP3 player may be selectively docked and undocked from the wall-mounted modular docking unit.

Figure 11:
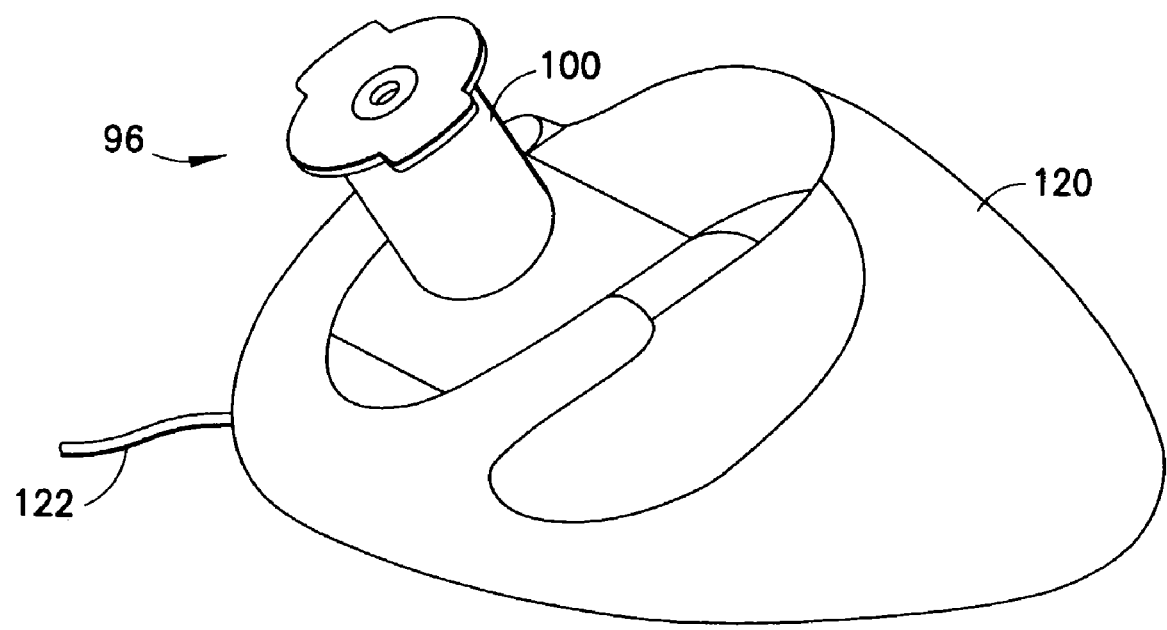
FIG. 11 is a desk mount device, in which the short adaptor of FIG. 10 may be reposed, to provide desktop access of a user to the MP3 player as reposed in the docking unit coupled with the adaptor mounted on the desk mount article.

FIG. 11 is a perspective view of a desk mount article 120, in which the short adaptor 96 shown in FIG. 10 may be selectively reposed, or coupling with the desk mount article 120 joined to power cord 122.

The modular docking unit as shown in FIGS. 1-6 may thereby be coupled with the adaptor 96 of the desk mount article by engagement of the engagement structure with the cavity 37 and electrical coupling 38 as shown in FIG. 2.

Figure 12:
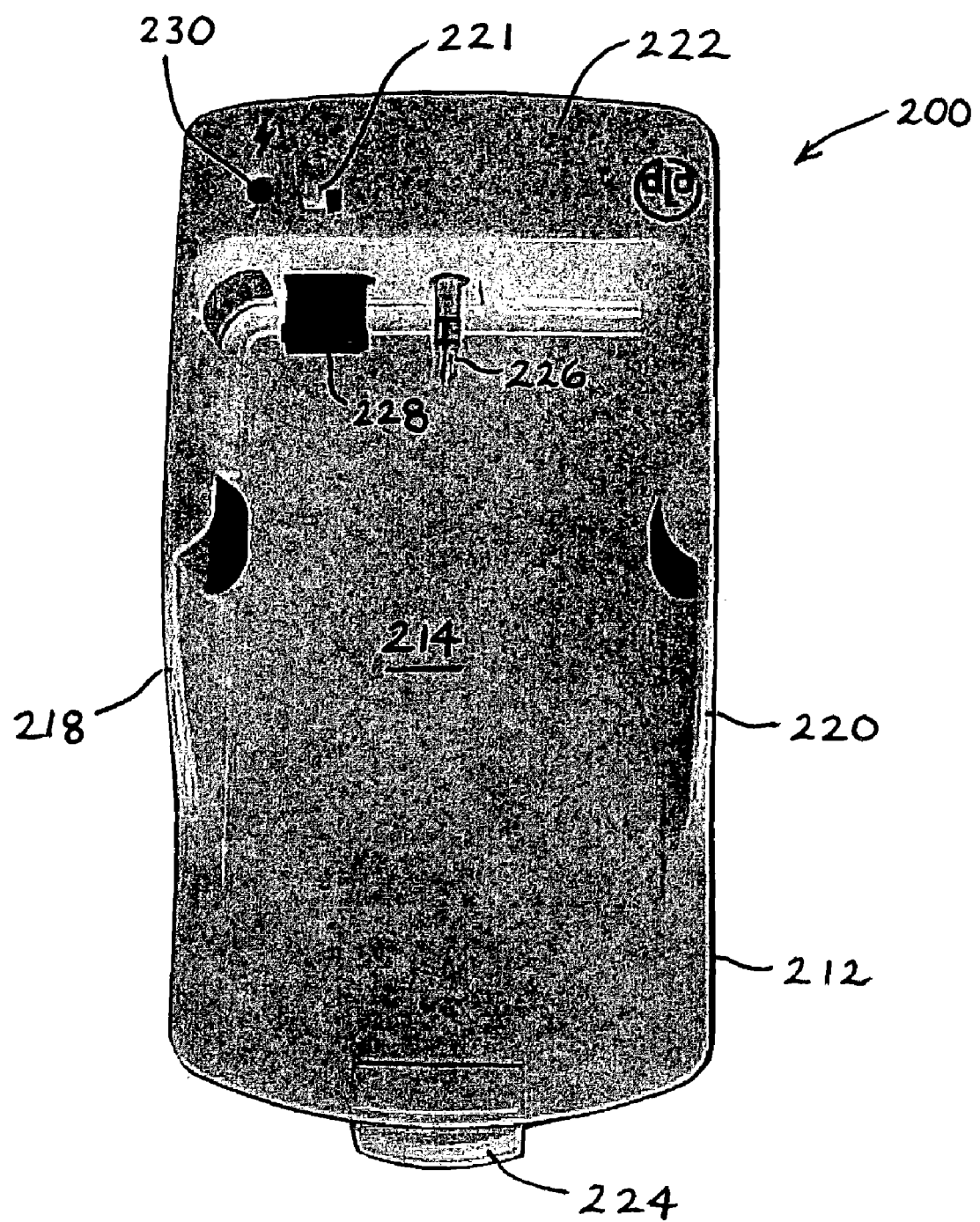
FIG. 12 is a front elevation view of an FM transmitter and power supply/charging assembly, according to another embodiment of the present invention.

FIG. 12 is a front elevation view of an FM transmitter and power supply/charging assembly 200, or modular docking unit, according to another embodiment of the present invention.

The modular docking unit 200 includes a main body portion 212 defining a cavity for selectively reposing the MP3 player therein. The cavity is bounded by back wall 214 and side rails 218 and 220. Extending into the cavity is a male connector 226, which may serve to couple the modular docking unit with the headphone jack of the MP3 player, as well as a coupling 228 matably engagable with the firewire port of the MP3 player. The cavity as shown is also bounded by laterally inwardly facing elements, which serve as inwardly extending tabs on the respective side rails, to assist in retaining the MP3 player in position in the cavity during audio play, storage or charging of the player.

On the upper portion 222 of the modular docking unit 200 in the position shown, is provided an LED power indicator light 230, and a firewire port adjustment switch 221, which serves to laterally reposition the coupling 228 in the cavity, so that the coupling is placed in register with the firewire port of the MP3 player.

On the lower portion of the modular docking unit 200 in the position illustrated in FIG. 12, a retractable security shelf member 224 is provided. The shelf member 224 can be selectively manually adjusted to a forward position to assist in retaining the MP3 player in the cavity of the unit, so that the MP3 player is positionally fixtured in the cavity of the modular docking unit during use or charging of the MP3 player.

In the ensuing FIGS. 13-17, all parts and structural features of the modular docking unit are correspondingly numbered to the same parts and structural features as shown in FIG. 12, for ease of reference.

Figure 13:
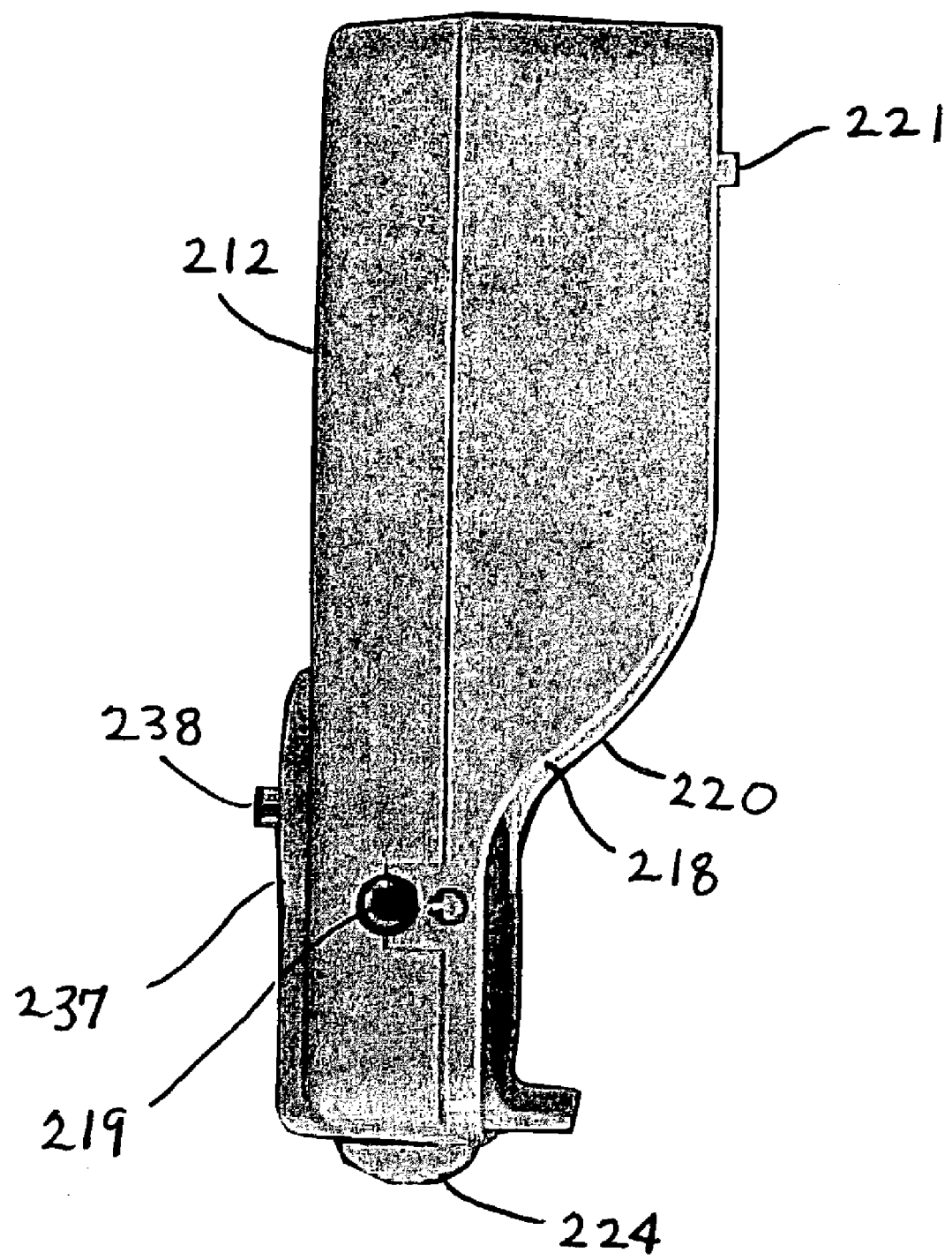
FIG. 13 is a left-hand side view, in elevation, of the assembly of FIG. 12.

FIG. 13 is a left-hand side view, in elevation, of the modular docking unit 200 of FIG. 12, showing the boss 237 on the rear surface of the unit and the protruding power connector element 238. A headphone jack 219 is provided on the side surface of the unit, as shown, for selective use of the modular docking unit in a headphones-engaged listening mode when an MP3 player is mounted in the unit.

Figure 14:
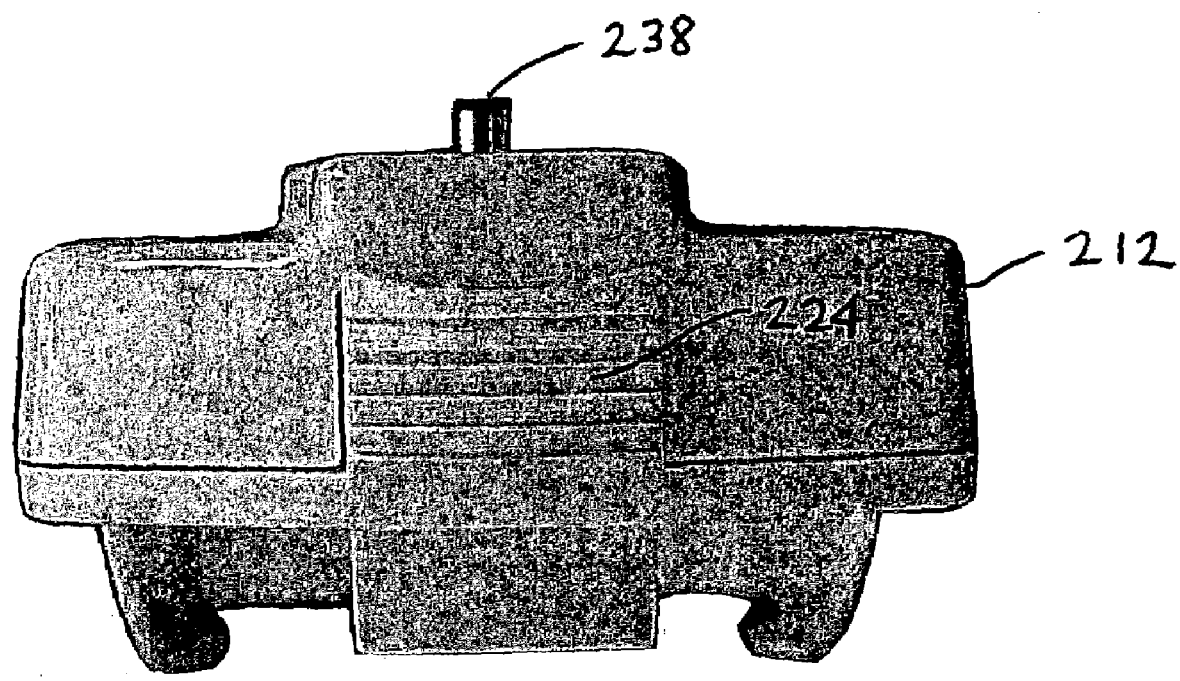
FIG. 14 is a bottom plan view of the assembly shown in FIG. 12.

FIG. 14 is a bottom plan view of the modular docking unit shown in FIG. 12, showing the retractable security shelf 224. The shelf member includes a ridged surface to facilitate engagement with the thumb or other digit of the user, in selectively extending the shelf forwardly to secure the MP3 player in position, or alternatively to retract the shelf so that the MP3 player can be removed from the modular docking unit.

Figure 15:
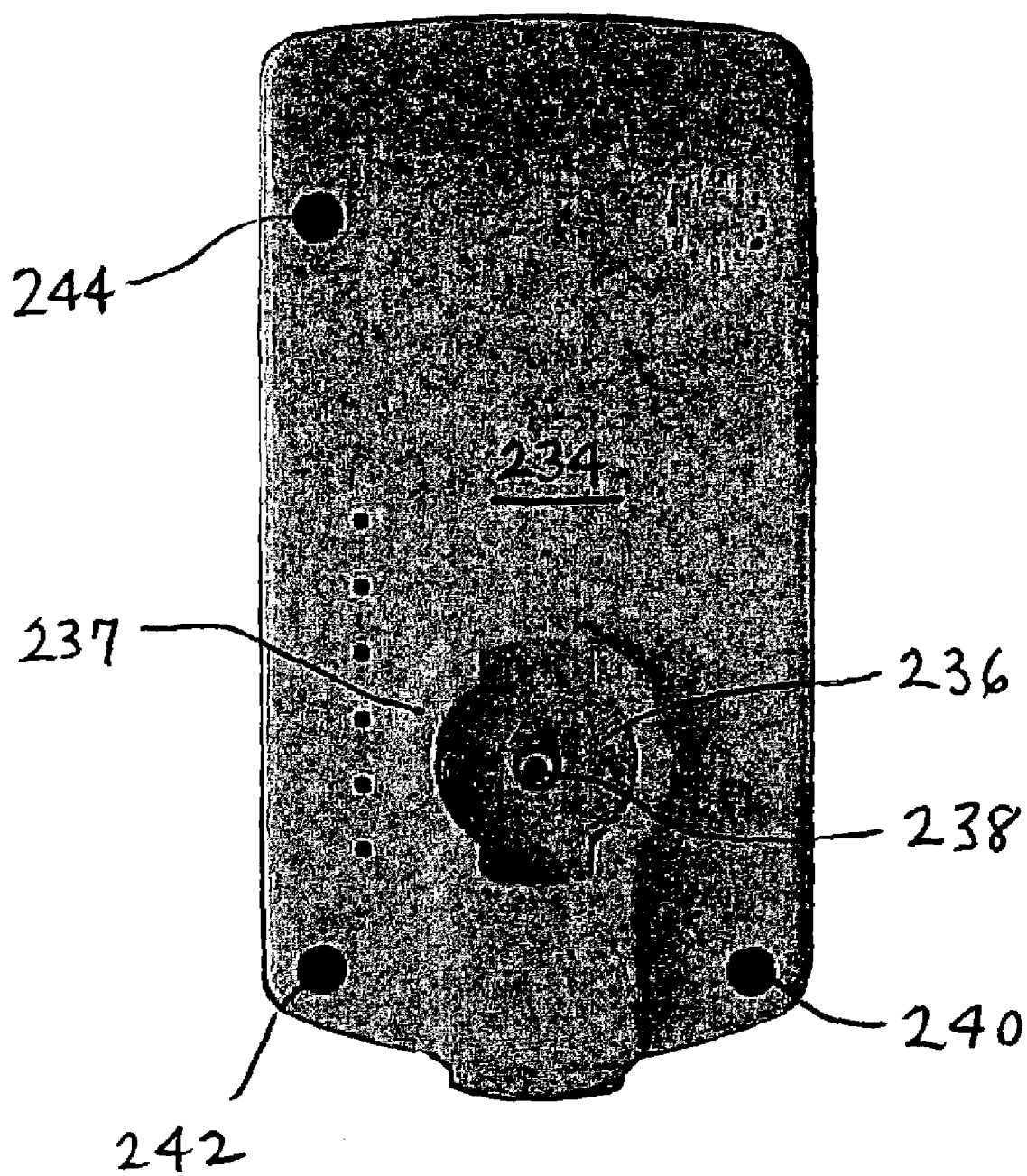
FIG. 15 is a rear elevation view of the FM transmitter and power supply/charging assembly of FIG. 12.

FIG. 15 is a rear elevation view of the modular docking unit of FIG. 12, showing the boss 237 on the back wall surface 234. The boss 237 forms a coupling cavity 236 including the power connector element 238 therein. The housing of the modular docking unit of this embodiment can be of two-piece construction, wherein each of the front and back sections of the housing are secured to one another by means of mechanical fasteners 240, 242 and 244, as shown. The housing of the modular docking unit may alternatively be formed of single-piece construction, or otherwise formed and fabricated in a suitable manner facilitating the assembly of the unit.

Figure 16:
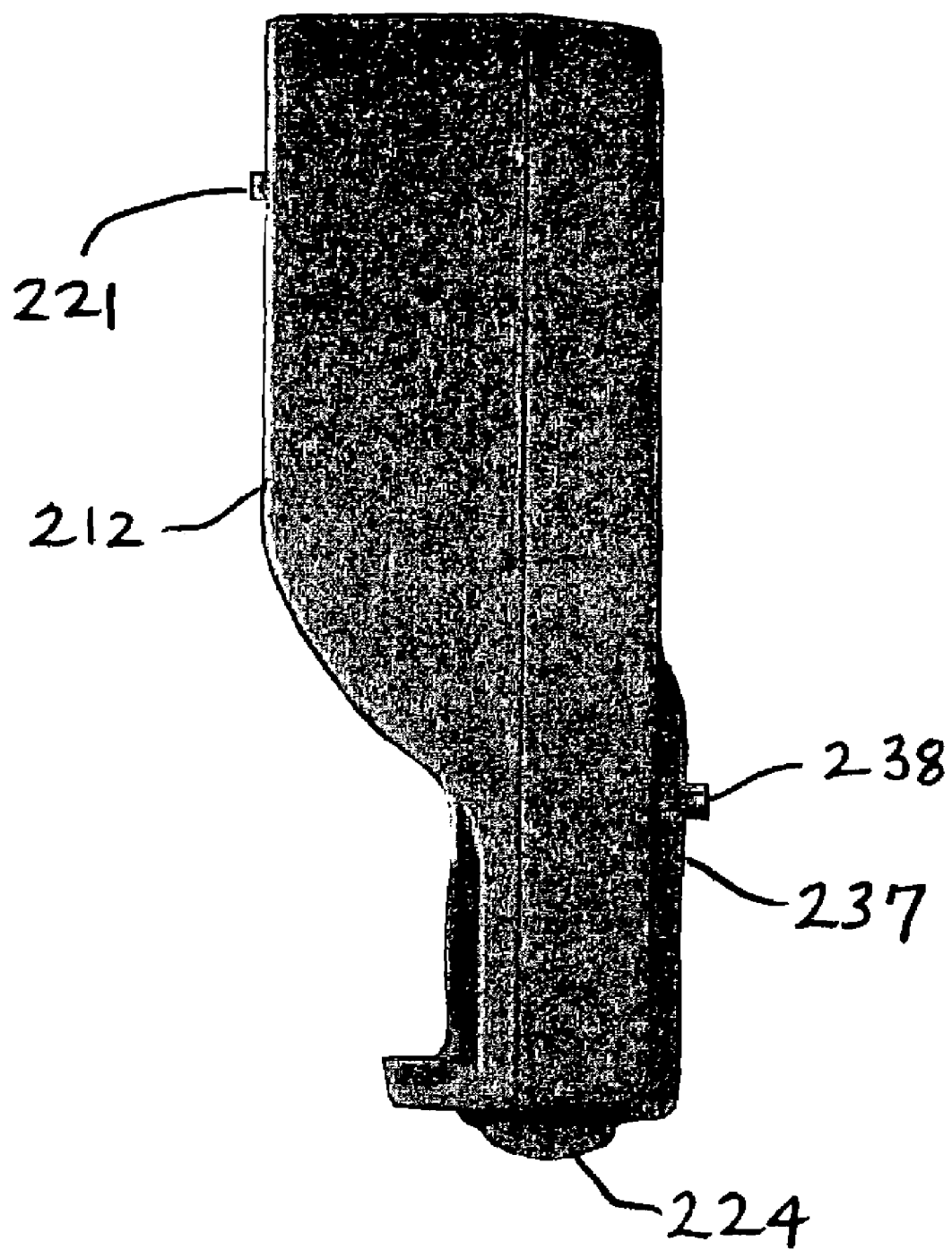
FIG. 16 is a right-hand side view, in elevation, of the assembly of FIG. 12.

FIG. 16 is a right-hand side view, in elevation, of the assembly of FIG. 12, showing the boss 237 on the back wall surface and the power connector element 238 protruding therefrom. The retractable security shelf 224 is shown at the bottom of the unit in the view illustrated, and the firewire port adjustment switch 221 is shown protruding from the upper end of the unit.

Figure 17:
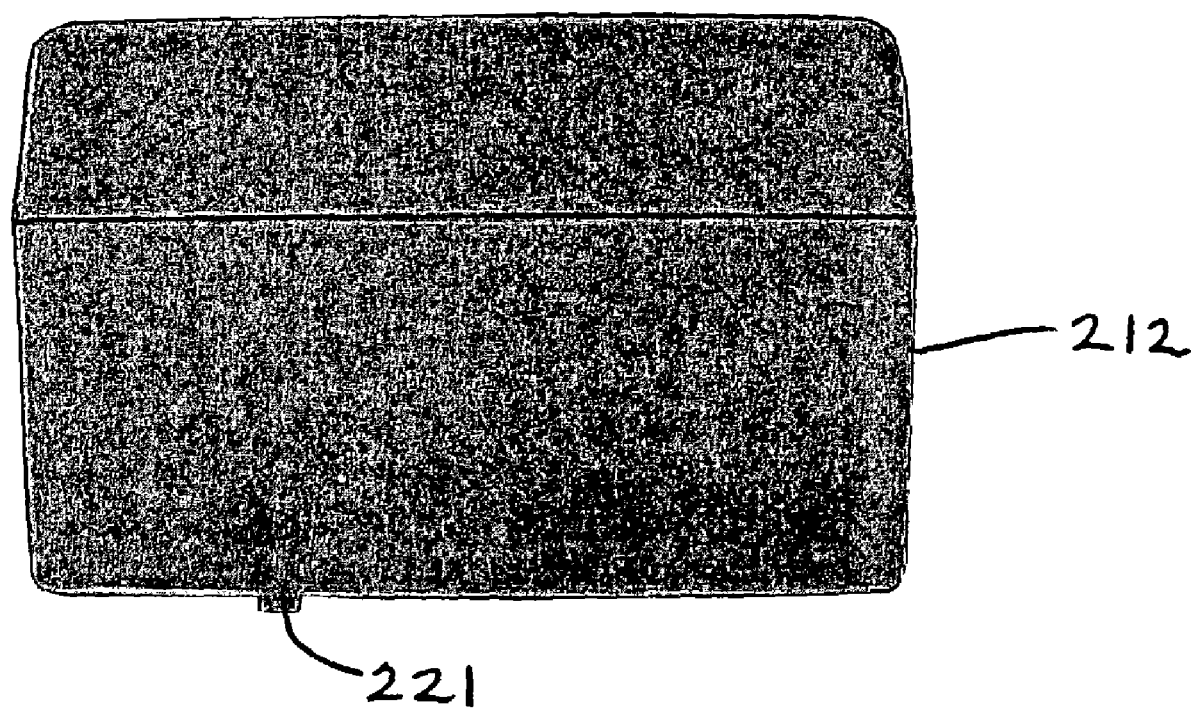
FIG. 17 is a top plan view of the FM transmitter and power supply/charging assembly shown in FIG. 12.

FIG. 17 is a top plan view of the modular docking unit shown in FIG. 12, with the firewire port adjustment switch 221 protruding from the front surface of the main body portion 212 of the unit.

Figure 18:
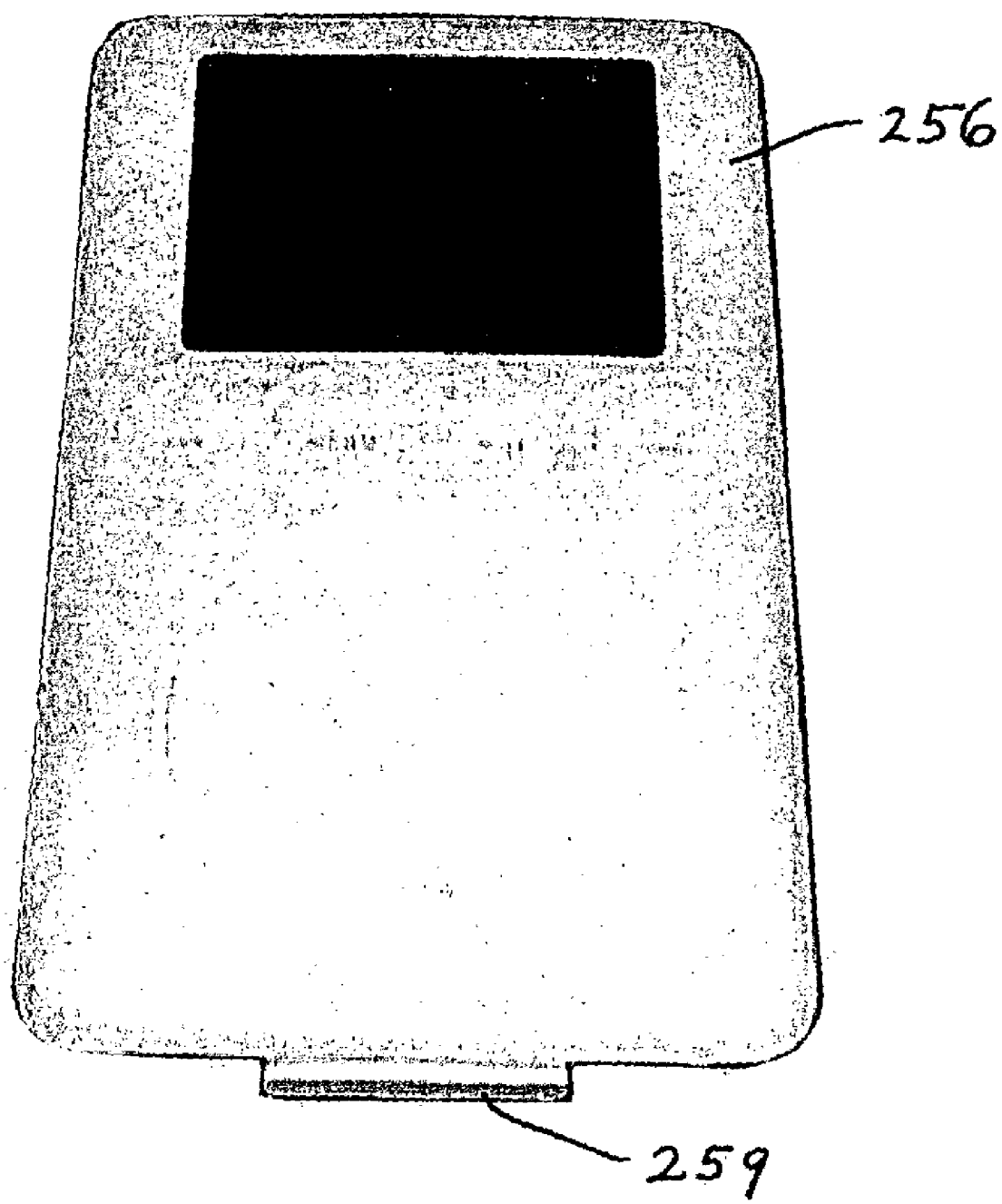
FIG. 18 is a perspective view of an MP3 player having a connector adapted for coupling with a firewire port or a USB port.

FIG. 18 is a perspective view of an MP3 player 256 having a connector 259 adapted for docking with a firewire port or a USB port. The MP3 player 256 illustrated in FIG. 18 is an iPOD® MP3 player, available from Apple Computer, Inc., Cupertino, Calif., although other MP3 players can be used with the modular docking unit according to various embodiments of the invention.

Figure 19:
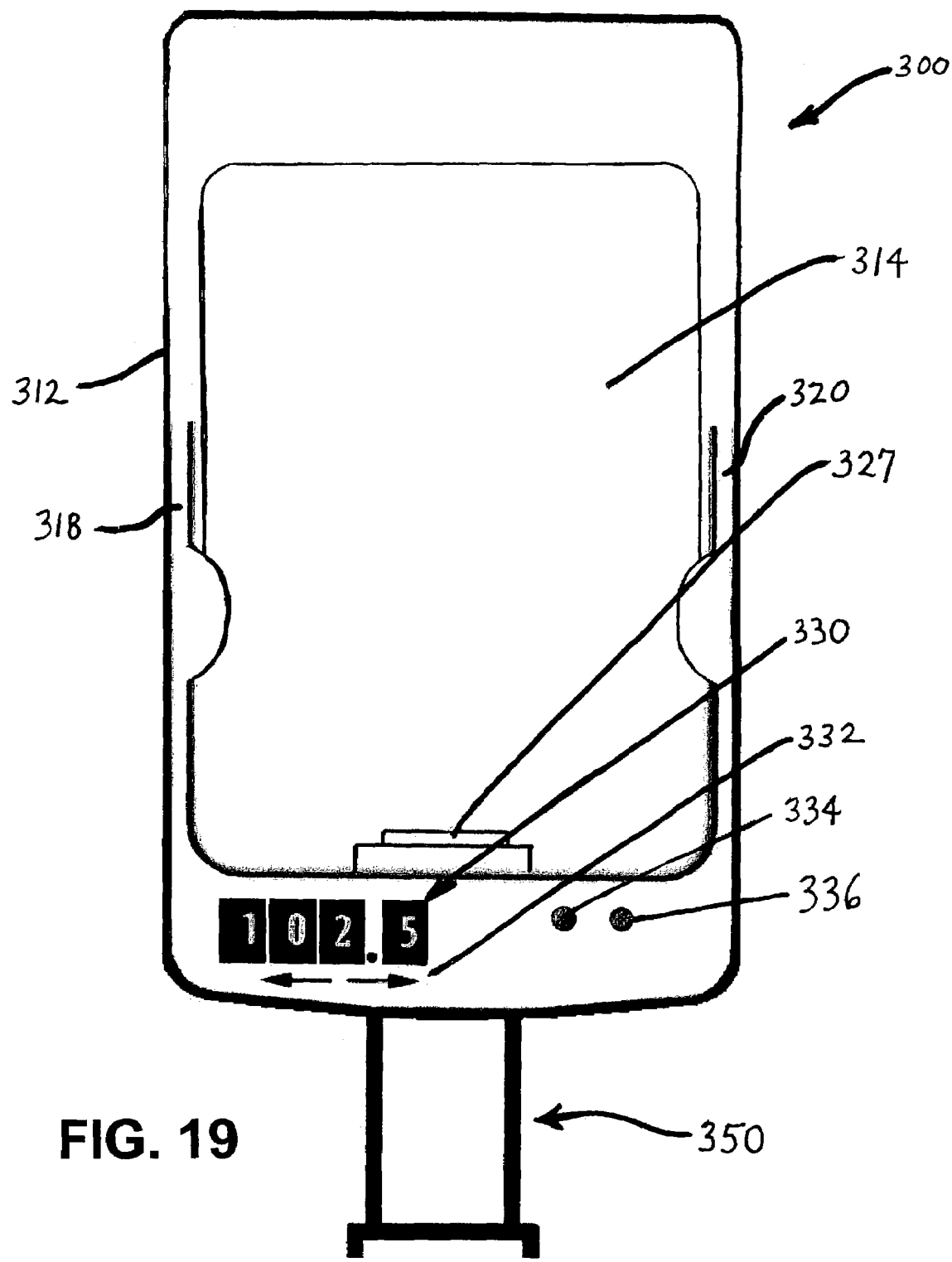
FIG. 19 is a schematic front elevation view of an FM transmitter and power supply/charging assembly according to another embodiment of the invention, arranged for mounting therein of an MP3 player of the type shown in FIG. 18.

FIG. 19 is a schematic front elevation view of a modular docking unit 300 according to another embodiment of the invention, arranged for mounting therein of an MP3 player of the type shown in FIG. 18. The modular docking unit 300 includes a housing 312 defining a cavity therein bounded by back wall surface 314 and the side rails 318 and 320 of the housing. At the bottom extremity of the cavity is positioned a dock connector 327 that mates with the connector 259 of the MP3 player 256 (see FIG. 18).

The modular docking unit 300 has on a lower portion of the housing, on a frontal surface thereof, a frequency indicator display 330, which in the drawing indicates a frequency of 102.5 megahertz (MHz) being transmitted by the transmitter in the docking unit. Below the frequency indicator display is a tuning control 332, which can be variously configured as a membrane switch, as a thumb-wheel control, or other control member that is selectively actuatable to increase or decrease the transmitter frequency, as desired.

To the right of the frequency indicator display 327 on the lower portion of the housing 312 is a power indicator 334, which may comprise an LED or other suitable element indicating the power "ON" or "OFF" status of the unit. Adjacent to the power indicator 334 is an FM transmitter indicator element 336 which may likewise comprise an LED or other suitable element indicating the "ON" or "OFF" status of the FM transmitter disposed in the housing.

The modular docking unit 300 of FIG. 19 is shown as coupled to a flexible 12-volt cigarette lighter adapter 350, to enable the unit to be powered from the electrical system of a vehicle, by plug-in of the adapter 350 into the cigarette lighter of the vehicle. The connected modular docking unit 300 then is situated to receive the MP3 player in the cavity of the housing, and to be actuated to transmit audio from the MP3 player to the sound system of the vehicle in which the modular docking unit is mounted.

It will therefore be recognized that the FM transmitter and power supply/charging assembly of the present invention may be widely varied in specific structure, while providing FM transmission ability to the MP3 player docked therein, and concurrently providing charging capability to the MP3 player battery, as well as power during docked usage of the MP3 player.

The various adaptor units shown, as well as the associated mounting articles, may be provided as a kit together with the FM transmitter and power supply/charging assembly, to provide a package of alternative parts for varied deployment of the docked MP3 player.

While the invention has been described herein with respect to various illustrative aspects, features and embodiments, it will be recognized that the invention is not thus limited, but that the present invention extends to and encompasses other features, modifications, and alternative embodiments, as will readily suggest themselves to those of ordinary skill in the art based on the disclosure and illustrative teachings herein. The claims that follow are therefore to be construed and interpreted as including all such features, modifications and alternative embodiments, within their spirit and scope.

What is claimed is:

1. An FM transmitter and power supply/charging assembly electrically coupleable with an MP3 player, said assembly comprising a modular docking unit having a main body portion with a docking cavity therein, with retention means for retaining the MP3 player in position in the cavity, wherein the main body portion contains said FM transmitter and power/charging circuitry, with coupling means in the docking cavity for connecting the MP3 player with the FM transmitter and power/charging circuitry, to accommodate FM transmission by said FM transmitter of audio content when played by said MP3 player in the docking cavity of the modular docking unit, and with means for transmitting electrical power through said modular docking unit and said power/charging circuitry therein, for charging of a battery of the MP3 player and/or powering of the MP3 player.

2. The assembly of claim 1, wherein the coupling means in the docking cavity comprises a firewire coupling.

3. The assembly of claim 1, wherein the modular docking unit comprises at least one indicator light indicative of the operational state of the unit.

4. The assembly of claim 3, wherein the indicator light indicates the "ON" or "OFF" state of the unit.

5. The assembly of claim 3, wherein the indicator light indicates the charging status of a battery in an MP3 player docked in the cavity of the modular docking unit.

6. The assembly of claim 1, wherein the modular docking unit comprises a housing formed of polymeric material.

7. The assembly of claim 1, wherein the FM transmitter has a transmission range of up to about 6 feet.

8. The assembly of claim 1, wherein the FM transmitter produces an output frequency audio signal in a range of from about 85 to about 95 Megahertz.

9. The assembly of claim 1, wherein said FM transmitter produces a single output frequency signal.

10. The assembly of claim 1, wherein said FM transmitter produces a variable output frequency signal.

11. The assembly of claim 1, which is constructed and arranged to dock with an iPOD™ MP3 player.

12. A sound system including an FM transmitter and power supply/charging assembly as in claim 1, and an MP3 player docked in the docking cavity of the modular docking unit of said assembly.

13. The sound system of claim 12, wherein the MP3 player comprises an iPOD™ MP3 player.

14. The sound system of claim 12, arranged for transmission of music to a table-type FM receiver.

15. The sound system of claim 12, arranged for transmission of music to a vehicular FM receiver for outputting of sound from vehicular audio speakers.

16. The sound system of claim 12, wherein the MP3 player includes a firewire port.

17. The sound system of claim 12, wherein the FM transmitter has a transmission range of up to about 6 feet.

18. The sound system of claim 12, wherein the FM transmitter produces an output frequency audio signal in a range of from about 85 to about 95 Megahertz.

19. The sound system of claim 12, wherein the FM transmitter produces an output variable frequency audio signal.

20. An MP3 player accessory kit, comprising an FM transmitter and power supply/charging assembly as in claim 1, and at least one power adaptor/charger for said FM transmitter and power supply/charging assembly.

21. The assembly of claim 1, wherein the retention means comprise side rails on said main body portion, bounding said cavity.

22. The assembly of claim 21, wherein the retention means further comprise lateral tabs extending inwardly from said side rails.

23. The assembly of claim 1, wherein the retention means comprise a retractable shelf member mounted on said main body portion.

24. The assembly of claim 23, wherein the retractable shelf member is arranged for manual actuation by a digit of a user.

25. The assembly of claim 23, wherein the retractable shelf member is positioned at a first end of the cavity and said coupling means are positioned in the cavity at a second opposite end of the cavity.

26. The assembly of claim 1, wherein said coupling means comprise a dock connector that is matably engagable with a connector of the MP3 player adapted for coupling with any of a firewire coupling and a USB coupling.

27. The assembly of claim 1, further comprising a frequency indicator on the main body portion.

28. The assembly of claim 1, further comprising a frequency tuning control on the main body portion.

29. The assembly of claim 1, wherein the main body portion has a generally rectangular shape.

30. The assembly of claim 1, further comprising a headphones jack on the main body portion and coupled to said circuitry.

31. The assembly of claim 1, wherein the main body portion includes a housing comprising a plurality of parts.

32. The assembly of claim 31, wherein the at least two parts of the plurality of parts are removably coupled together.

33. The assembly of claim 1, wherein any of the FM transmitter and power/charging circuitry is disposed entirely within the main body portion.

34. The assembly of claim 1, wherein the means for transmitting electrical power comprises a plug connector engageable with a cigarette lighter socket of a motor vehicle.

35. The assembly of claim 1, wherein the power/charging circuitry comprises at least one conductive electrical circuit element.

36. The assembly of claim 1, wherein the at least one electrical circuit element comprises any of an electrical contact and a power cord.

37. The assembly of claim 1, wherein the power/charging circuitry is adapted to power and/or charge the MP3 player.

38. The assembly of claim 1, further comprising an adjustable mounting element adapted to maintain the docking assembly in any of a plurality of spatial positions, wherein the mounting element is affixed to a plug connector engageable with a cigarette lighter socket of a motor vehicle.

39. The assembly of claim 1 wherein the MP3 player comprises a storage medium adapted to receive and store digital media files.

40. The assembly of claim 1 wherein the transmitter has selectively adjustable digital frequency tuning and the assembly further comprises a digital frequency indicator display for displaying the transmission frequency.

41. A radio frequency transmitter and power supply/charging assembly electrically coupleable with an MP3 player, said assembly comprising:
a main body portion defining a cavity for receiving the MP3 player, and having an associated radio frequency transmitter and power/charging circuitry;
coupling means disposed in the cavity for connecting the MP3 player with the radio frequency transmitter and power/charging circuitry when the MP3 player is received by the cavity, to accommodate radio frequency transmission by said radio frequency transmitter of audio content when played by said MP3 player; and
means for transmitting electrical power through said power/charging circuitry and said coupling means, for charging of a battery of the MP3 player and/or powering of the MP3 player.

42. The assembly of claim 41, wherein the radio frequency transmitter produces an output frequency audio signal in a range of from about 85 to about 95 Megahertz.

43. The assembly of claim 41, wherein the radio frequency transmitter produces a single frequency modulated output frequency signal.

44. The assembly of claim 41, wherein the radio frequency transmitter produces a variable output frequency signal.

45. The assembly of claim 41, wherein the means for transmitting electrical power through said power/charging circuitry, and said coupling means comprises a plug connector engageable with a cigarette lighter socket of a motor vehicle.

46. The assembly of claim 41, wherein the main body portion comprises a plurality of parts.

47. The assembly of claim 46, wherein at least two parts of the plurality of parts are removably coupled together.

48. The assembly of claim 41, wherein any of the radio frequency transmitter and power/charging circuitry is disposed entirely within the main body portion.

49. The assembly of claim 41, wherein the power/charging circuitry comprises at least one conductive electrical circuit element.

50. The assembly of claim 41, further comprising an adjustable mounting element adapted to maintain the main body portion in any of a plurality of spatial positions, wherein the mounting element is affixed to a plug connector engageable with a cigarette lighter socket of a motor vehicle.

51. The assembly of claim 41 wherein the MP3 player comprises a storage medium adapted to receive and store digital media files.

52. The assembly of claim 41 wherein the radio frequency transmitter has selectively adjustable digital frequency tuning and the assembly further comprises a digital frequency indicator display for displaying the transmission frequency.

53. The assembly of claim 41 wherein the coupling means comprises any of a firewire coupling and a USB coupling.

54. An FM transmitter and power supply/charging assembly electrically coupleable with an MP3 player, said assembly comprising an FM transmitter and power/charging circuitry, a docking unit defining a docking cavity therein for receiving an MP3 player, and an electrical coupling disposed in the docking cavity and electrically coupleable with the MP3 player when the MP3 player is received by the docking cavity, wherein the docking unit is constructed and arranged for connecting the MP3 player with said FM transmitter and power/charging circuitry, to accommodate FM transmission by said FM transmitter of audio content when played by said MP3 player in the docking cavity of the docking unit, and with means for transmitting electrical power through said power/charging circuitry, for charging of a battery of the MP3 player and/or powering of the MP3 player.

55. The assembly of claim 54, wherein the means for transmitting electrical power comprises a plug connector engageable with a cigarette lighter socket of a motor vehicle.

56. The assembly of claim 54, wherein the means for transmitting electrical power comprises an AC charger.

57. The assembly of claim 54, wherein the power/charging circuitry comprises at least one conductive electrical circuit element.

58. The assembly of claim 57, wherein the at least one electrical circuit element comprises any of an electrical contact and a power cord.

59. The assembly of claim 54, further comprising an adjustable mounting element adapted to maintain the docking unit in any of a plurality of spatial positions, wherein the mounting element is affixed to a plug connector engageable with a cigarette lighter socket of a motor vehicle.

60. The assembly of claim 54 wherein the MP3 player comprises a storage medium adapted to receive and store digital media files.

61. The assembly of claim 54 wherein the FM transmitter has selectively adjustable digital frequency tuning and the assembly further comprises a digital frequency indicator display for displaying the transmission frequency.

62. The assembly of claim 54 wherein the electrical coupling comprises any of a firewire coupling and a USB coupling.

63. An FM transmitter and power supply/charging assembly electrically coupleable with an MP3 player, said assembly comprising an FM transmitter and power/charging circuitry, a docking unit defining a docking cavity therein for receiving an MP3 player, and an electrical coupling disposed in the docking cavity and electrically coupleable with the MP3 player when the MP3 player is received by the docking cavity, wherein the docking unit is constructed and arranged for connecting the MP3 player with said FM transmitter and power/charging, circuitry, to accommodate FM transmission by said FM transmitter of audio content when played by said MP3 player in the docking cavity of the docking unit, and with means for transmitting electrical power through said power/charging circuitry, for charging of a battery of the MP3 player and/or powering of the MP3 player.

64. The assembly of claim 63, further comprising an electrical coupling disposed in the docking cavity and electrically coupleable with the MP3 player.

65. The assembly of claim 64 wherein each of the FM transmitter and the at least one power/charging circuit element is in electrical communication with the electrical coupling.

66. The assembly of claim 63 wherein the MP3 player comprises a storage medium adapted to receive and store digital media files.

67. The assembly of claim 63 wherein the FM transmitter has selectively adjustable digital frequency tuning and the assembly further comprises a digital frequency indicator display for displaying the transmission frequency.

68. The assembly of claim 63 wherein the electrical coupling comprises any of a firewire coupling and a USB coupling.

69. An FM transmitter and power supply/charging assembly electrically coupleable with an MP3 player, said assembly comprising:
   a body adapted to receive the MP3 player;
   an electrical coupling affixed to the body to engage the MP3 player when the MP3 player is received by the body;
   an FM transmitter connectable with said MP3 player for FM transmission of audio content played by said MP3 player; and
   power/charging circuitry connectable with said MP3 player for transmission of electrical power therethrough to charge and/or power the MP3 player.

70. The assembly of claim 69, further comprising an adjustable mounting element adapted to maintain the MP3 player in any of a plurality of spatial positions, wherein the adjustable mounting element is affixed to a plug connector engageable with a cigarette lighter socket of a motor vehicle.

71. The assembly of claim 69 wherein the MP3 player comprises a storage medium adapted to receive and store digital media files.

72. The assembly of claim 69 wherein the FM transmitter has selectively adjustable digital frequency tuning and the assembly further comprises a digital frequency indicator display for displaying the transmission frequency.

73. The assembly of claim 69 wherein the electrical coupling comprises any of a firewire coupling and a USB coupling.

* * * * *